US009348333B1

(12) United States Patent
Buchmueller et al.

(10) Patent No.: US 9,348,333 B1
(45) Date of Patent: May 24, 2016

(54) MODULAR AIR DELIVERY

(71) Applicant: Amazon Technologies, Inc., Seattle, WA (US)

(72) Inventors: Daniel Buchmueller, Seattle, WA (US); Jack Erdozain, Jr., Homestead, FL (US); Gur Kimchi, Bellevue, WA (US); Brandon William Porter, Yarrow Point, WA (US); Ricky Dean Welsh, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 37 days.

(21) Appl. No.: 14/563,647

(22) Filed: Dec. 8, 2014

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B64D 1/08* | (2006.01) |
| *B64F 5/00* | (2006.01) |
| *B64D 31/00* | (2006.01) |
| *B64D 45/00* | (2006.01) |
| *B64C 39/02* | (2006.01) |
| *G06Q 10/08* | (2012.01) |

(52) U.S. Cl.
CPC ............ *G05D 1/0011* (2013.01); *B64C 39/024* (2013.01); *B64D 1/08* (2013.01); *B64D 31/00* (2013.01); *B64D 45/00* (2013.01); *B64F 5/0009* (2013.01); *G06Q 10/083* (2013.01); *B64C 2201/128* (2013.01)

(58) Field of Classification Search
CPC ............... G07C 5/008; G07C 9/00309; G07C 2009/00793; B60R 25/24; F02N 11/0807
USPC ............................................................ 701/2
See application file for complete search history.

(56) References Cited

U.S. PATENT DOCUMENTS

| | | | | |
|---|---|---|---|---|
| 2015/0336669 A1* | 11/2015 | Kantor | ............... | G01C 21/3415 701/3 |
| 2015/0336671 A1* | 11/2015 | Winn | .................... | B64C 39/024 701/3 |
| 2015/0339933 A1* | 11/2015 | Batla | .................... | G08G 5/0069 701/120 |
| 2015/0379874 A1* | 12/2015 | Ubhi | ...................... | G01S 5/0027 701/3 |

* cited by examiner

*Primary Examiner* — Maceeh Anwari
(74) *Attorney, Agent, or Firm* — Thomas|Horstemeyer LLP; Michael D'Aurelio; Jason Perilla

(57) ABSTRACT

Aspects of modular airborne delivery are described. When a shipping container is provided to an airborne carrier for delivery, the airborne carrier may assess weather across a route for airborne delivery of the shipping container, evaluate an approach to drop the shipping container at a delivery zone, and calculate a remaining amount of time until a target delivery time, for example. The airborne carrier may then select components to assemble a modular unmanned aerial vehicle (UAV) based on those or other factors, and assemble the UAV using the selected components. The modular UAV may then be directed to deliver the shipping container according to instructions from the airborne carrier. According to the concepts described herein, flexibility and other advantages may be achieved using modular UAVs for airborne delivery.

20 Claims, 5 Drawing Sheets

MODULAR AIR DELIVERY

BACKGROUND

After an order is placed through an electronic commerce marketplace, items in the order are picked, the order is packaged into one or more shipping or packing containers, and the shipping or packing containers are provided to a carrier for delivery. The purchaser may choose a class of delivery service based upon considerations such as price, delivery speed, etc. The purchaser may also choose one or more shipping options including insurance, tracking, or confirmation, etc. Typically, a carrier will gather several packages for delivery to various addresses along a delivery route, using a delivery truck, for example, without any need to customize the delivery truck and/or the delivery route for the packages individually.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding, but not necessarily the same, parts throughout the several views.

DETAILED DESCRIPTION

Various aspects of modular air delivery are described herein. More particularly, when a shipping container or package including one or more items from a product order is provided to an airborne carrier for delivery, the airborne carrier assembles an unmanned aerial vehicle (UAV) (i.e., aircraft, drone, etc.) from modular components. The modular UAV is then directed to deliver the shipping container over an airborne delivery route according to instructions from the airborne carrier. According to aspects of the embodiments described herein, the airborne carrier may select or assemble the modular UAV based on various considerations, such as a weight and/or volume of the shipping container, a target delivery time, the weather, a route or approach to a target delivery zone, safety considerations, or other considerations.

Figure 1:
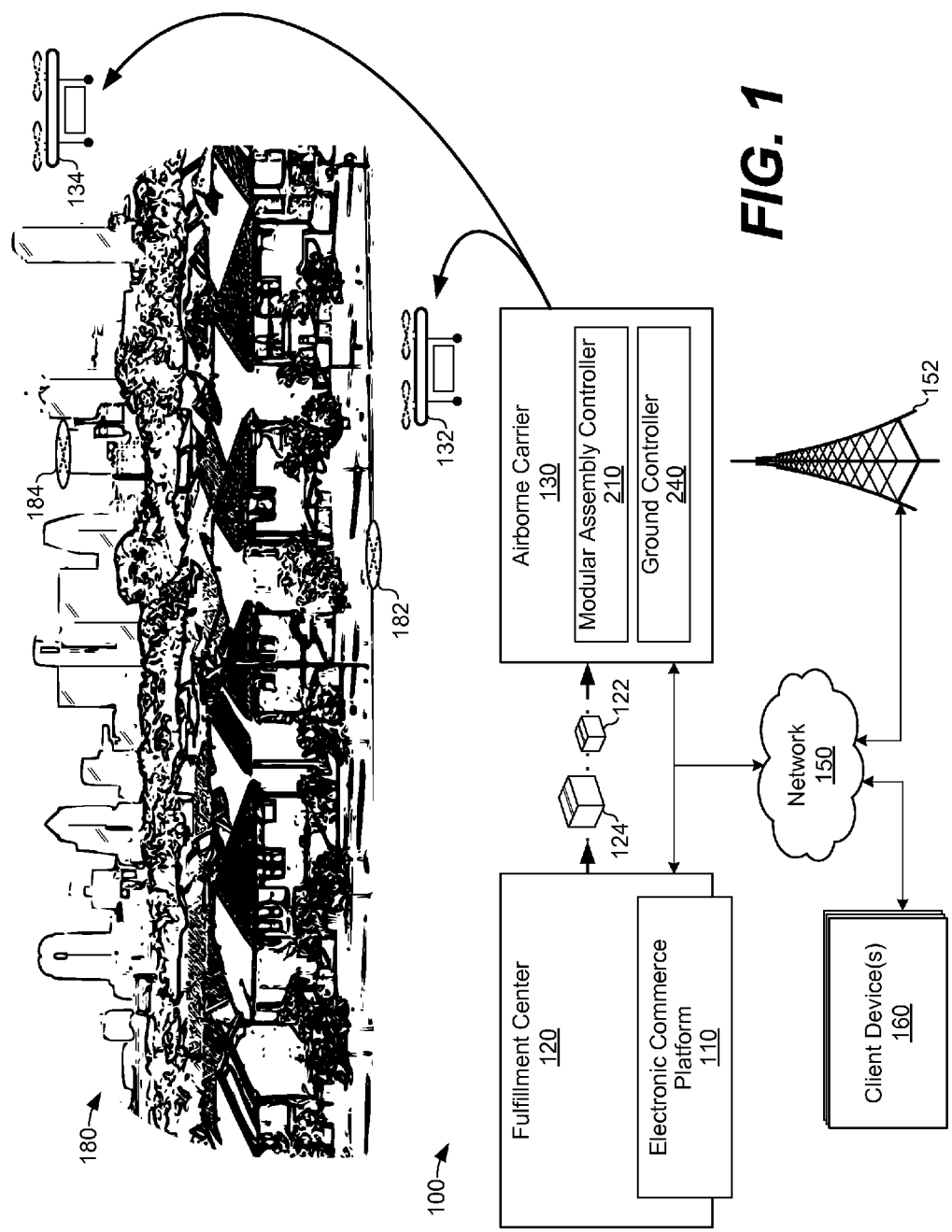
FIG. 1 illustrates a system for modular air delivery according to various embodiments of the present disclosure.

Turning to FIG. 1 for additional context, FIG. 1 illustrates a system 100 for modular air delivery. The system 100 includes an electronic commerce platform 110, a fulfillment center 120, an airborne carrier 130, a network 150, and one or more client devices 160. As described herein, the system 100 provides a modular air delivery service to the geographic region 180. Starting with a concise operating description of the system 100, in one example, an order may be placed through the network 150 to the electronic commerce platform 110 using one of the client devices 160. Next, the order may be submitted from the electronic commerce platform 110 to the fulfillment center 120 for fulfillment (e.g., picking, packing, etc.). At the fulfillment center 120, one or more items from the order are packaged into a first shipping container 122 for delivery. In turn, the fulfillment center 120 provides the shipping container 122, along with a destination address for delivery, to the airborne carrier 130 for airborne delivery. In one embodiment, the airborne carrier 130 may be integrated with the fulfillment center 120 and operate as part of the fulfillment center 120. Alternatively, the airborne carrier 130 may be a separate entity from the entity that operates the fulfillment center 120. Similarly, the electronic commerce platform 110 may be integrated with (e.g., collocated at) or separate from the fulfillment center 120.

To deliver the shipping container 122, the airborne carrier 130 assembles a first UAV 132 from modular components. In various embodiments, the UAV 132 may be assembled based on instructions from the modular assembly controller 210, as further described below. Once assembled, the UAV 132 may then proceed to deliver the shipping container 122 to the delivery zone 182 in the geographic region 180. Similarly, to deliver a second shipping container 124, which may include items for another order originated via the electronic commerce platform 110, the airborne carrier 130 assembles a second UAV 134 from modular components. Again, the UAV 134 may be assembled based on instructions from the modular assembly controller 210. Once assembled, the UAV 134 then proceeds to deliver the shipping container 124 to the delivery zone 184 in the geographic region 180. In some embodiments, one or both of the UAVs 132 and 134 may be directed to different delivery zones 182 and 184, respectively, by the ground controller 240, as further described below. In this context, during and/or after delivery, the ground controller 240 may wirelessly communicate with the UAVs 132 and 134 via the network 150, which may include wireless (e.g., cellular, satellite, etc.) services 152.

It is noted that the airborne carrier 130 may assemble first UAV 132 using different modular components as compared to those used to assemble second UAV 134 based on various factors and/or considerations described herein. For example, because the volume and/or weight of the shipping container 122 may differ from that of the shipping container 124, the UAV 132 may be assembled using a different modular platform, a different thruster arrangement, and/or a different battery, for example, to accommodate for the difference in weight. Further, because of the difference in distance to the delivery zone 184 as compared to the delivery zone 182, the airborne carrier 130 may assemble the UAV 132 using different modular components as compared to the UAV 134. In this context, the airborne carrier 130 may assemble the UAV 134 using components for a faster delivery to the delivery zone 184, for example, to account for the increased distance to the delivery zone 184. Alternatively, the airborne carrier 130 may assemble the UAV 134 using a different (e.g., more sophisticated) arrangement of sensors as compared to the UAV 132, because more accuracy is needed in the approach to the delivery zone 184, which is in an urban environment, as compared to that for the delivery zone 182.

As described in further detail below with reference to FIG. 2, the modular assembly controller 210 may provide instructions to assemble the UAVs 132 and 134 (and others) based on various considerations, such as a weight and/or volume of shipping containers, target delivery times, the weather, safety considerations, etc. The modular assembly controller 210 may take these and other factors into account when identifying suitable modular components from which to build the UAVs 132 and 134, as further described below. Additionally, the modular assembly controller 210 may receive certain information from the ground controller 240, such as route and/or approach data, and the modular assembly controller 210 may consider this information when providing instructions to assemble the UAVs 132 and 134.

The modular assembly controller 210 may provide instructions to assemble the UAVs 132 and 134 from any number of different modular components, including but not limited to one or more airborne platforms, thrusters, sensors, control systems, airfoils, batteries, loading bays, and other components. In this sense, a UAV may be assembled from a smaller or greater number of modular components, depending upon the considerations described herein. In certain embodiments, rather than selecting a number of components from which to assemble a UAV, the modular assembly controller 210 may select a UAV from among group of pre-assembled UAVs having different characteristics depending upon the considerations described herein.

Figure 2:
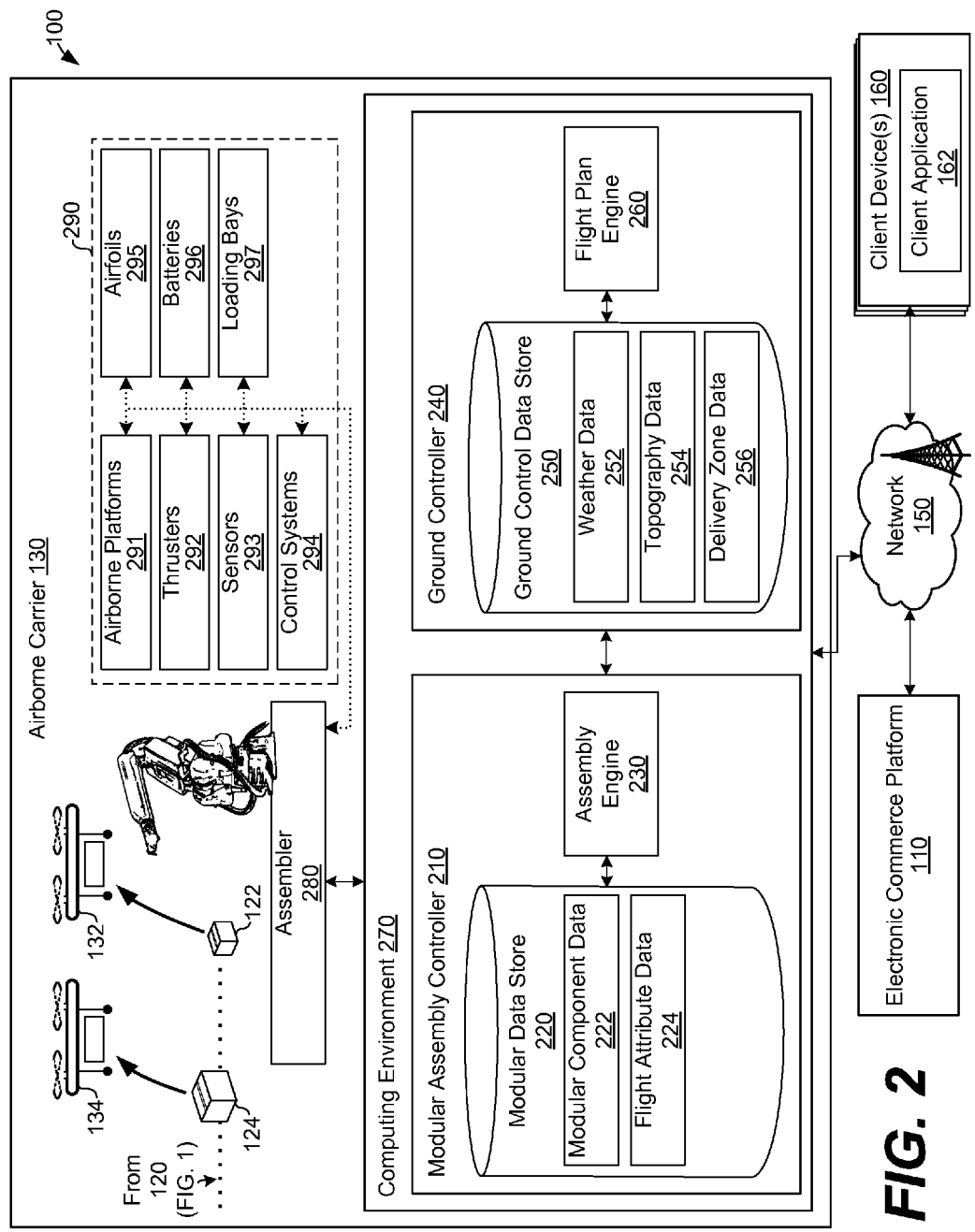
FIG. 2 illustrates the system for modular air delivery in FIG. 1 with an expanded view of the elements of the airborne carrier according to various embodiments of the present disclosure.

With an expanded view of the elements of the airborne carrier 130, FIG. 2 illustrates another view of the system 100 for modular air delivery. As also shown in FIG. 1, the airborne carrier 130 includes the modular assembly controller 210 and the ground controller 240. The modular assembly controller 210 includes the modular data store 220 and the assembly engine 230. In the modular data store 220, modular component data 222 and flight attribute data 224, as illustrated in FIG. 2, may be stored along with any other data relied upon by the assembly engine 230. The operation of the assembly engine 230 and use of the data stored in the modular data store 220 is described in further detail below. The ground controller 240 includes the ground control data store 250 and the flight plan engine 260. In the ground control data store 250, weather data 252, topography data 254, and delivery zone data 256, for example, may be stored along with any other data relied upon by the flight plan engine 260. The operation of the flight plan engine 260 and use of the data stored in the ground control data store 240 is described in further detail below. The modular assembly controller 210 and the ground controller 240 may be embodied in the computing environment 270. The airborne carrier 130 also includes the assembler 280 and the modular components 290, each of which is described in further detail below. For simplicity, the fulfillment center 120 (FIG. 1) is omitted from view in FIG. 2.

Before turning to a more detailed description of the airborne carrier 130, it should be appreciated that the electronic commerce platform 110, the fulfillment center 120, and the airborne carrier 130 may be geographically located together with or apart from each other. In one embodiment, the electronic commerce platform 110 is geographically located apart from the fulfillment center 120, although the fulfillment center 120 is located together with (or relatively close to) the airborne carrier 130. In other aspects of the embodiments, it should be appreciated that the modular assembly controller 210, the ground controller 240, and/or the assembly controller 280 may be geographically located together with or apart from each other. In this context, although the modular assembly controller 210 and the ground controller 240 are illustrated in FIG. 2 as being embodied in the computing environment 270, the modular assembly controller 210 and the ground controller 240 may be embodied in separate computing environments, systems, or devices.

The computing environment 270 may be embodied as a computer system or device. In certain embodiments, the computing environment 270 may include one or more computing devices arranged, for example, in one or more server or computer banks. The computing device or devices may be located at a single installation site or distributed among different geographical locations. As further described below in connection with FIG. 5, the computing environment 270 may include a plurality of computing devices that together embody a hosted computing resource, a grid computing resource, and/or other distributed computing arrangement. In some cases, the computing environment 270 may be embodied as an elastic computing resource where an allotted capacity of processing, network, storage, or other computing-related resources varies over time. The computing environment 270 may also be embodied, in part, as various functional (e.g., computer-readable instruction) and/or logic (e.g., device, circuit, or processing circuit) elements that direct the modular assembly controller 210 and/or the ground controller 240 to perform aspects of the embodiments described herein.

The electronic commerce platform 110 may be embodied as a computer system or device that operates an electronic marketplace for selling goods and/or services. In this context, the electronic commerce platform 110 may facilitate the online purchase of items over the network 150. The electronic commerce platform 110 may also perform various back end functions associated with the online presence of a merchant to facilitate the online purchase of items. For example, the electronic commerce platform 110 may generate network pages, such as web pages or other types of network content, that are provided to the client devices 160 for selecting items for purchase.

In certain embodiments, the electronic commerce platform 110 may be similar in composition to the computing environment 270, including one or more computing devices arranged, for example, in one or more server or computer banks. In one embodiment, the computing environment 270 and the electronic commerce platform 110 may communicate with each other via the network 150. In other embodiments, the computing environment 270 and the electronic commerce platform 110 may be embodied in a shared (e.g., collocated or integrated) computing system.

The network 150 may include the Internet, intranets, extranets, wide area networks (WANs), local area networks (LANs), wired networks, wireless networks, cable networks, cellular-based networks, satellite-based networks, other suitable networks, or any combinations thereof. The electronic commerce platform 110, the client devices 160, and the computing environment 270 may communicate with each other using various protocols, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or any other suitable protocols for communicating data over the network 150, without limitation.

The client devices 160 are representative of one or a plurality of client devices of one or more users. The client devices 160 may be embodied as any computing device or system, including but not limited to those embodied in the form of a desktop computer, a laptop computer, a cellular telephone, or a tablet computer, among other example computing devices and systems. The client devices 160 may also include various peripheral devices, for example. In this context, the peripheral devices may include input devices such as, for example, a keyboard, keypad, touch pad, touch screen, microphone, scanner, mouse, joystick, camera, or one or more buttons, etc.

The peripheral devices may also include a display, indicator lights, speakers, etc., depending upon the primary use of the client devices 160.

As illustrated in FIG. 2, the client devices 160 may execute various applications, such as the client application 162, which is representative of one application that may be executed on a client device 160. In one embodiment, the client application 162 may be embodied as a browser application. Such a browser application may be directed by an individual to purchase certain items from the electronic commerce platform 110, for example, via the network 150. To this end, the client application 162 may be embodied as a commercially available hypertext-based internet browser or other browser or variant thereof, without limitation. Alternatively, the client application 162 may be embodied as one or more other applications that interact with the electronic commerce platform 110 using a suitable protocol via the network 150.

Turning to a more detailed description of the operation of the airborne carrier 130, after an order is placed to the electronic commerce platform 110 through the network 150 using one of the client devices 160, for example, the order is submitted to the fulfillment center 120 for fulfillment (e.g., picking, packing, etc.). At the fulfillment center 120, one or more items from the order are packaged into the shipping containers 122 and/or 124, for example. In turn, the fulfillment center 120 may provide the shipping containers 122 and/or 124 to the airborne carrier 130 for airborne delivery, as shown in FIG. 2.

To deliver the shipping containers 122 and/or 124, the airborne carrier 130 may assemble one or both of the UAVs 132 and 134 from the modular components 290. In various embodiments, the UAVs 132 and 134 may be assembled based on instructions generated by the modular assembly controller 210, as further described below. The instructions from the modular assembly controller 210 may be provided to the assembler 280 that, in turn, assembles modular UAVs, such as the UAVs 132 and 134, according to the instructions. Generally, the instructions may indicate which ones of the modular components 290 should be assembled together to provide the UAVs 132 and 134.

The assembler 280 may be embodied as one or more assembly lines, robotic pickers, assembly robots, etc., configured to assemble modular UAVs using the modular components 290 based on the instructions provided from the modular assembly controller 210. In some embodiments, the assembler 280 may include one or more individuals that may assist, at least in part, with the assembly of modular UAVs.

The modular components 290 may include components (e.g., parts) from which various types of UAVs may be assembled by the assembler 280. Depending upon the components used, the UAVs may differ in certain characteristics of airborne delivery, such as shipping volume or weight capacity, flight speed, flight distance, flight accuracy, delivery zone approach accuracy, obstacle avoidance or safety, or other characteristics. In this context, the modular components 290 may include various airborne platforms 291, thrusters 292, sensors 293, control systems 294, airfoils 295, batteries 296, loading bays 297, and other components, for example, from which different configurations of UAVs may be assembled. For any particular airborne delivery task, the modular assembly controller 210 may select a group of the modular components 290 for assembly of a modular UAV based on various factors and/or considerations described herein.

The airborne platforms 291 may include various configurations and sizes of platforms, including or excluding airfoils (i.e., fixed wings, vertical stabilizers, horizontal stabilizers, etc.), for assembling various horizontal and/or vertical take-off and landing and/or horizontal-thrust and/or vertical-thrust rotor craft. Using one of the airborne platforms 291 as a base structure, the assembler 280 may attach additional components, such as one or more of the thrusters 292, sensors 293, control systems 294, airfoils 295, batteries 296, loading bays 297, or other components, to form a UAV. The thrusters 292 may include different types and sizes of motors, engines, etc., with or without associated propellers.

The sensors 293 may include various sensors including but not limited to cameras, multi-dimensional camera arrays, infrared or thermal sensors, radar sensors, laser-based survey sensors (e.g., LIDAR), electro-optical/infrared sensor packages, one or more micro- or nano-electromechanical system (NEMS or MEMS) or other accelerometers, gyroscopes, or orientation sensors, global positioning system (GPS) sensors, height, altitude, or altimeter sensors, ultrasonic sensors, atmospheric pressure sensors, etc. In addition to individual ones of the sensors 293 being available for selection, the sensors 293 may be embodied in various arrangements or packages of sensors. For example, camera and radar sensors may be incorporated together with one or more accelerometers, gyroscopes, or orientation sensors in a single, modular sensor package. In this way, the sensors 293 may be simplified to a more limited set of modular sensor packages.

The sensors 293 may provide data for navigation of UAVs, such as the UAVs 132 and 134, for example, along a predetermined delivery route, for example, and to approach a delivery zone for delivery. For example, data from one or more of the sensors 293 may be provided to one of the control systems 294 that, in turn, navigate the UAV for a delivery. Additionally, data captured by the sensors 293 may be provided as feedback to the modular assembly controller 210 and/or the ground controller 240 for reference during the generation of assembly instructions for other UAVs and/or for the evaluation of delivery routes or approaches to delivery zones for other airborne deliveries.

The control systems 294 may include various application-specific, embedded, and/or general-purpose computing or control systems that may be configured to control the flight and delivery operations of UAVs, such as the UAVs 132 and 134, for example. In this context, each of the control systems 294 may include one or more processors or processing circuits, logic, memory, etc., that may be configured to control the flight and delivery operations of a UAV. In one embodiment, the control systems 294 may be programmed or otherwise directed by the ground controller 240 for flight and delivery operations. Particularly, as further described below, the flight plan engine 260 may evaluate a flight plan or route to a delivery zone and generate flight plan instructions for airborne delivery based on the evaluation. Similarly, the flight plan engine 260 may evaluate the conditions for a safe approach (e.g., shipping container drop) at a delivery zone. In this context, the flight plan engine 260 may review data related to the delivery zone, such as the geographic location, accessibility, visibility, population or construction density (e.g., urban vs. suburban) etc., to generate approach instructions. The flight plan and/or approach instructions may be provided to (e.g., programmed into, wirelessly communicated to, etc.) a control system 294 before, during, and/or after the control system 294 is assembled by the assembler 280 with components of a UAV.

The airfoils 295 may include various modular wings, fins, tails, etc. Depending upon weather conditions, the need for speed during airborne delivery, the distance to be traveled, or other factors, the modular assembly controller 210 may select one or more of the airfoils 295 for assembly with a UAV. It should be appreciated, however, that there are situations in which the modular assembly controller 210 may not select one (or any) of the airfoils 295 for assembly with a UAV. The batteries 296 may include various sizes, types, and configurations of batteries to provide energy to one of more of the thrusters 292, the sensors 293, or the control systems 294, for example, among other components in a UAV. The modular assembly controller 210 may select one or more of the batteries 296 based on size, type, or configuration with reference to various considerations, such as weight, capacity, distance to be flown, etc., as described herein. The loading bays 297 may include various sizes and configurations of modular loading bays. In this context, it is noted that a loading bay may be selected to enclose a shipping container during delivery, although the use of a loading bay is not required for every configuration of UAV.

The description of the modular components 290 provided above is given by way of example and should not be limiting. Consistent with the concepts of modular air delivery described herein, other modular components may be relied upon. Further, in variations on the modular components 290 described above, it should be appreciated that certain modular components may be integrated with each other, for example, in certain configurations. For example, one or more of the batteries 296 may be provided or integrated with one or more of the loading bays 297. As another example, one or more of the sensors 293 may be provided or integrated with one or more of the control systems 294. It is also noted that one or more of the modular components 290 may be assembled together in any suitable manner by the assembler 280. In this sense, the assembler 280 may rely upon certain types of standard connectors to snap or fit one or more of the modular components 290 together. Additionally or alternatively, the assembler 280 may rely upon fasteners such as screws, bolts, snaps, etc. to secure one or more of the modular components 290 together.

Referring again to FIG. 2, the assembly engine 230 is configured to select one or more of the modular components 290 to assemble UAVs, such as the UAVs 132 and 134, for example. When selecting modular components, the assembly engine 230 may take various factors and/or considerations into account, such as a weight and/or volume of one or more shipping containers to be delivered via airborne delivery, a target delivery time for the airborne delivery, the weather across a route for the airborne delivery, an approach to drop the shipping container at a delivery zone, the accuracy required for the approach, a flight distance to the delivery zone, the required flight speed to the delivery zone (i.e., remaining time to target delivery), required flight accuracy, the necessity for obstacle avoidance or safety, and/or other factors or considerations. In various embodiments, the assembly engine 230 may be provided with, or need to calculate, one or more of the factors. For example, the electronic commerce platform 110 may provide an address or coordinates to a target delivery zone, along with a target delivery time for airborne delivery of one or both of the shipping containers 122 and 124. On the other hand, the assembly engine 230 may calculate a remaining amount of time until the target delivery time or the required flight speed. Similarly, the assembly engine 230 may evaluate the approach to drop the shipping container at the delivery zone, the required accuracy in the approach, and/or the necessity for obstacle avoidance or safety during an airborne delivery.

When selecting the modular components 290 to assemble UAVs, the assembly engine 230 may reference the modular component data 222 and/or the flight attribute data 224. The modular component data 222 may include information related to certain characteristics of the modular components 290. For example, the modular component data 222 may include information related to the sizes of the airborne platforms 291, the charge or power capacities of the batteries 296, the processing capabilities of the control systems 294, and/or the types of data gathered by the sensors 293. Similarly, the flight attribute data 224 may include information related to flight characteristics of the modular components 290. For example, the flight attribute data 224 may include information about the flight characteristics of the airborne platforms 291, the airfoils 295, and/or the loading bays 297. Additionally, the modular component data 222 and/or the flight attribute data 224 may include information related to operating characteristics for combinations of two or more of the modular components 290. In this sense, the modular component data 222 and/or the flight attribute data 224 may include information related to flight characteristics for a combination of one of the airborne platforms used with one or more of the airfoils 295.

When selecting the modular components 290, the assembly engine 230 may also receive input from the ground controller 240. For example, the ground controller 240 may provide information related to a suggested route for airborne delivery, present or future weather conditions across or along a route for airborne delivery, the topography of natural and/or man-made structures along the route, and or any obstacles or considerations to be taken into account when making a final approach to drop a shipping container at a delivery zone. The information provided from the ground controller 240 may be determined, calculated, or otherwise evaluated by the flight plan engine 260. The flight plan engine 260 may reference the weather data 252, the topography data 254, and/or the delivery zone data 256 when providing information to the assembly engine 230. Generally, the weather data 252 includes information on present or future weather conditions in one or more geographic regions. Further, the topography data includes information on natural and/or man-made structures in one or more geographic regions, and the delivery zone data includes coordinate, obstacle, and/or other data related to making the final approach to drop a shipping container.

Figure 3:
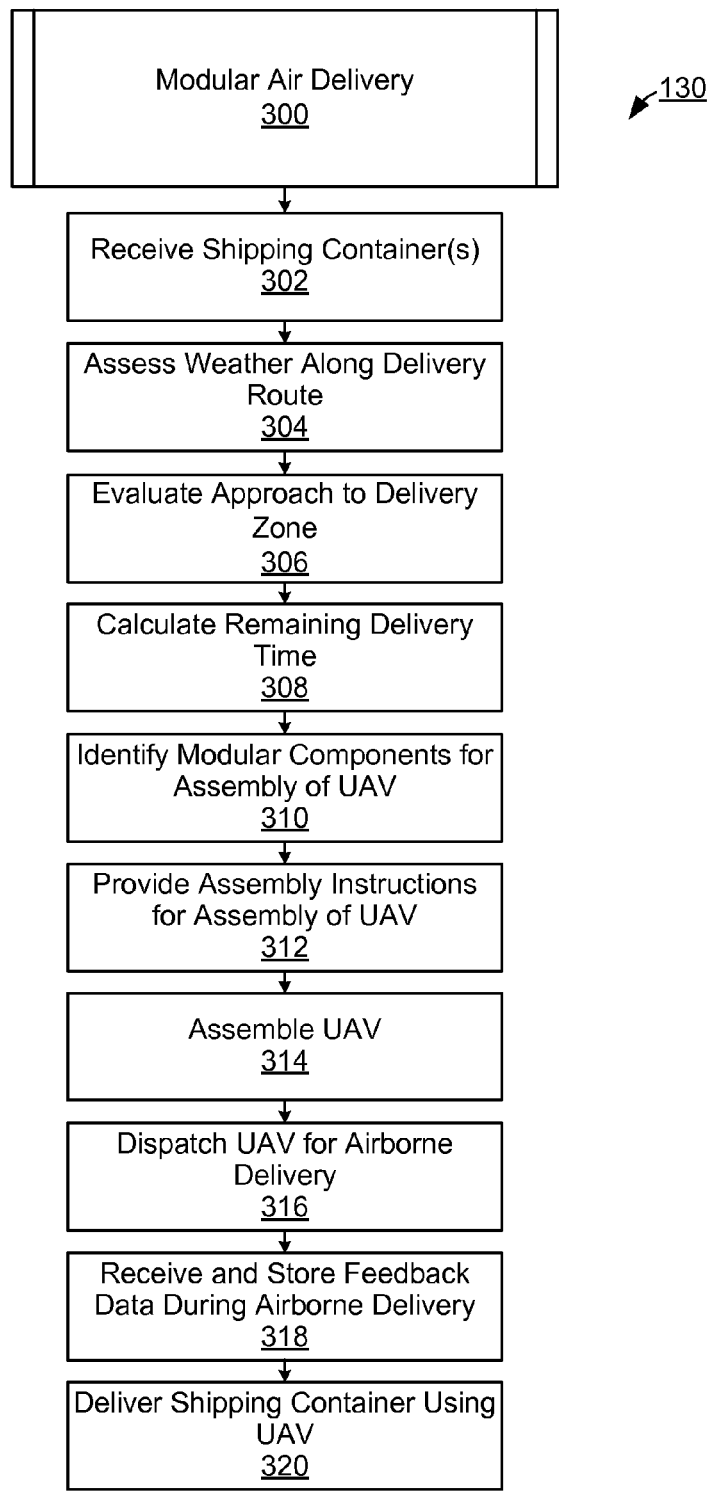
FIG. 3 illustrates an example flow diagram for a process of modular air delivery performed by the system in FIG. 2 according to various embodiments of the present disclosure.

FIG. 3 illustrates an example modular airborne delivery process 300 performed by the airborne carrier 130 of the system 100 in FIGS. 1 and 2. Although the process 300 is described in connection with the modular assembly controller 210, the ground controller 240, and the assembler 280 of the airborne carrier 130, other controllers, assemblers, etc. may perform the process in FIG. 3. In certain aspects, the flowchart in FIG. 3 may be viewed as depicting an example group of steps performed by airborne carrier 130 according to one or more embodiments.

As illustrated in FIG. 3, the process 300 includes receiving one or more shipping containers at reference numeral 302. With reference to FIG. 1 for example context, the shipping containers 122 and/or 124 may be provided at reference numeral 302 from the fulfillment center 120 to the airborne carrier 130 for airborne delivery. In addition, the electronic commerce platform 110 and/or the fulfillment center 120 may provide a delivery address, delivery coordinates, etc. to the airborne carrier 130 at reference numeral 302, along with a target delivery time for delivery of the containers 122 and/or 124, among other pertinent information.

At reference numeral 304, the process 300 includes assessing various aspects of the weather across a route to a delivery zone for airborne delivery of the one or more shipping containers received at reference numeral 302. Here, at reference numeral 304, the flight plan engine 160 (FIG. 2) may assess the weather across the route and/or provide data to the assembly engine 230 by which the weather may be assessed. The weather may be considered by the assembly engine 230 when identifying modular components, at reference numeral 310, for assembly of a UAV. More particularly, the assembly engine 230 may base the selection, at reference numeral 310, of one or more of the modular components 290 according to the assessment of the weather conducted at reference numeral 304. For example, the assembly engine 230 may base the selection of one or more of the thrusters 292, the sensors 293, and/or the airfoils 295 on the assessment of the weather at reference numeral 304.

At reference numeral 306, the process 300 includes evaluating an approach to drop the shipping container at the delivery zone. Here, the flight plan engine 160 (FIG. 2) may assess the final approach at a particular delivery zone and/or provide data to the assembly engine 230 by which the approach may be assessed. The evaluation may identify whether a vertical delivery zone was previously identified or used, whether any obstacles exist at the delivery zone, and/or whether any particular sensors are required for navigation at the delivery zone, for example. The evaluation may be considered by the assembly engine 230 when identifying modular components, at reference numeral 310, for assembly of a UAV. More particularly, the assembly engine 230 may base the selection, at reference numeral 310, of one or more of the modular components 290 according to the assessment of the approach conducted at reference numeral 306. For example, the assembly engine 230 may base the selection of one or more of the thrusters 292, the sensors 293, and/or the airfoils 295 on the approach evaluated at reference numeral 306.

At reference numeral 308, the process 300 includes calculating a remaining amount of time until a target delivery time for the airborne delivery. As noted above, the target delivery time for airborne delivery of one or more shipping containers, such as the shipping containers 122 and/or 124, may be provided to the assembly engine 230 by the electronic commerce platform 110 and/or the fulfillment center 120 at reference numeral 302. Here, the assembly engine 230 may calculate the remaining amount of time based on a difference between the current time and the target delivery time. The remaining amount of time until the target delivery time may be considered by the assembly engine 230 when identifying modular components, at reference numeral 310, for assembly of a UAV. For example, the assembly engine 230 may base the selection of one or more of the thrusters 292 on the remaining amount of time.

Overall, at reference numerals 304, 306, 308, and 310, a plurality of delivery considerations that may affect an airborne delivery may be evaluated and/or calculated. It is noted that the considerations described above are not intended to be exhaustive of or limiting to the scope of the embodiments. Further, the considerations may be evaluated in combination with each other. For example, the presence of relatively strong wings may be considered along with the evaluation of the approach to a delivery zone, to identify whether a particular type of platform or thruster is preferable.

At reference numeral 310, the process 300 includes identifying a set of modular components to assemble an unmanned aerial vehicle (UAV) for airborne delivery of the one or more shipping containers received at reference numeral 302. Among other factors described herein, the assembly engine 230 may identify or select the set of modular components based at least in part on any of the factors calculated and/or assessed at reference numerals 304, 306, or 308, or any other factors or considerations discussed herein. The identification of modular components at reference numeral 310 is described in further detail below with reference to FIG. 4. In one embodiment, rather than identifying a number of components from which to assemble a UAV, the process 300 may include selecting a UAV from among group of pre-assembled UAVs based on the factors calculated and/or assessed at reference numerals 304, 306, or 308, for example, at reference numeral 310.

At reference numeral 312, the process 300 includes providing assembly instructions to assemble a UAV using the set of modular components identified at reference numeral 310. Here, the assembly engine 230 may provide instructions to the assembler 280 (FIG. 2), for example. The instructions may identify a certain airborne platform 291, arrangement of the thrusters 292, and/or one or more of the sensors 293. Additionally or alternatively, the instructions may include a list of preferred modular components, along with suitable substitutes. Thus, if one or more of the modular components 290 are missing, in use, or otherwise unavailable, the instructions may indicate one or more suitable alternatives. Similarly, because the instructions may include a list of preferred modular components, the instructions may embody recommendations for assembly of a UAV, rather than a strict set of instructions.

At reference numeral 314, the process 300 includes assembling the UAV using the set of modular components identified at reference numeral 310 according to the instructions provided at reference numeral 312. In this context, at reference numeral 314, the assembler 280 (FIG. 2) may pick the set of modular components identified at reference numeral 310 from among the modular components 290 and assemble the UAV with reference to the assembly instructions provided by the assembly engine 230 at reference numeral 312.

At reference numeral 316, the process 300 includes dispatching the UAV assembled at reference numeral 314 with one or more of the shipping containers received at reference numeral 302, to deliver the shipping containers. At reference numeral 316, flight plan and/or approach instructions may be provided to (e.g., programmed into, wirelessly communicated to, etc.) a control system of the UAV assembled at reference numeral 314. The flight plan and/or approach instructions may have been previously generated and evaluated by the flight plan engine 260 and/or the assembly engine 230, for example.

At reference numeral 318, the process 300 includes receiving and storing feedback data from the UAV dispatched at reference numeral 316. In this context, it is noted that the UAV dispatched at reference numeral 316 is capable of capturing various types of data during its airborne delivery flight and/or approach to drop a shipping container at a delivery zone. For example, the UAV may capture images and/or topology data, flight performance data, approach data, weather data, or other types of data along the delivery route. This data may be provided by the UAV back to the modular assembly controller 210 and/or the ground controller 240 as data to be incorporated as part of the modular component data 222, the flight attribute data 224, the weather data 252, the topography data 254, or the delivery zone data 256. In one aspect of the embodiments, if insufficient data is available in the modular data store 220 and/or the ground control data store 250, the assembly engine 230 may select certain ones of the modular components 290 (FIG. 2) for feedback data collection. For example, if additional topography data 254 is needed, then the assembly engine 230 may select one or more particular sensors at reference numeral 310 to gather the desired topography data 254. Alternatively, if certain flight attribute data 224 is needed for a particular one of the airfoils 295, then the assembly engine 230 may select the particular one of the airfoils 295 to gather the desired flight attribute data 224.

At reference numeral 320, the process 300 includes delivering the one or more of the shipping containers received at reference numeral 302 using the UAV assembled at reference numeral 314. After the delivery at reference numeral 320, the UAV may return to the airborne carrier 130 for disassembly, and the process 300 may end.

Figure 4:
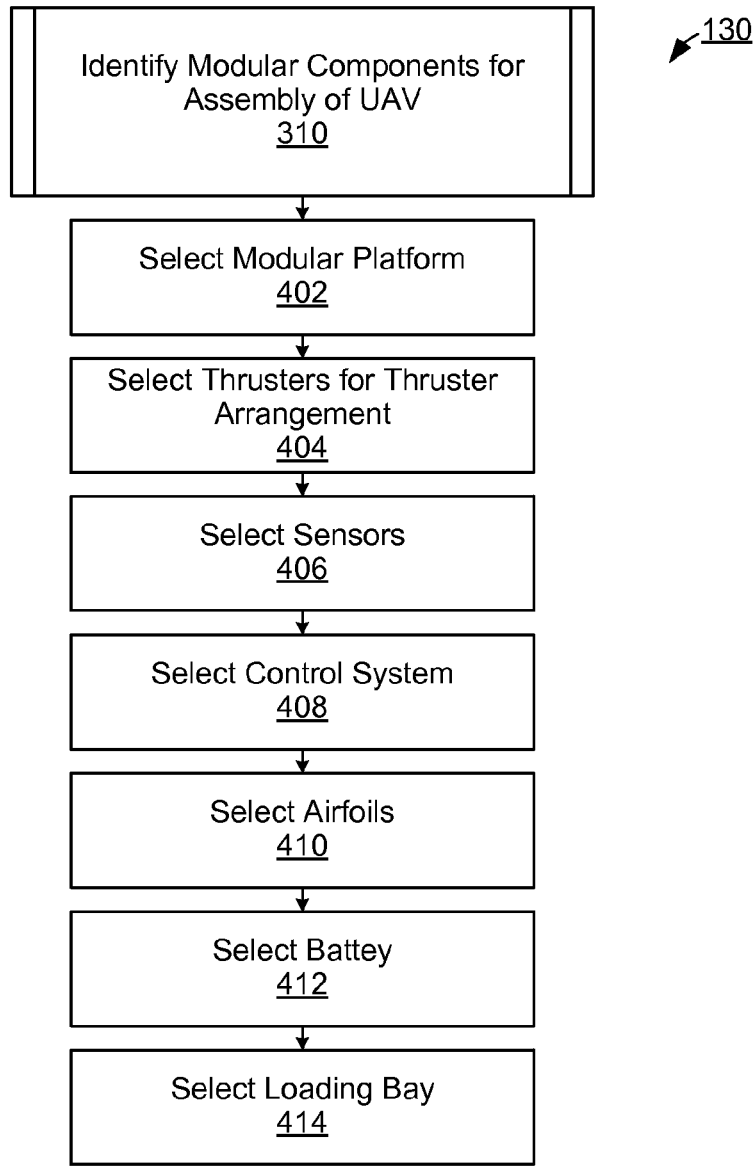
FIG. 4 further illustrates the example flow diagram for the process of modular air delivery performed by the system in FIG. 2 according to various embodiments of the present disclosure.

Turning to FIG. 4, certain considerations when identifying modular components (i.e., at reference numeral 310 in FIG. 3) are illustrated. In some embodiments, certain rules may be followed during the identification of modular components, using a rules-based approach, as described in some examples below. For example, if a UAV craft needs to take off and land vertically (e.g., if there is no horizontal approach clearance), then a certain set of the thrusters 292 may be identified for use at reference numeral 404. As another example, if the evaluation of the approach to a delivery zone indicates the likelihood of individuals being present in the vicinity of the delivery zone, then a particular infrared sensor 293 may be identified for use at reference numeral 406.

As shown in FIG. 4, identifying modular components may include selecting one or more of the modular airborne platforms 291 (FIG. 2) at reference numeral 402, selecting one or more of the thrusters 292 at reference numeral 404, selecting at least one of the sensors 293 at reference numeral 406, selecting at least one of the control systems 294 at reference numeral 408, selecting at least one of the airfoils 295 at reference numeral 410, selecting one or more of the batteries 296 at reference numeral 412, selecting one or more of the loading bays 297 at reference numeral 414, or selecting other components. Before turning to a discussion of reference numerals 402, 404, 406, 408, 410, 412, and 414, individually, it is noted that any one or more of the selections may be omitted in various embodiments. In other words, it is not necessary in the assembly of every UAV, for example, that an airfoil be selected at reference 410 or that a loading bay is selected at reference numeral 412. As such, a modular UAV may be assembled from other components without an airfoil or loading bay, for example, among other components that may be omitted. Further, it is not necessary in all embodiments that a single, particular component be selected at reference numerals 402, 404, 406, 408, 410, 412, and 414. Rather, one or more preferred modular components may be selected, along with suitable substitutes.

Consistent with the description provided above, the assembly engine 210 may select a modular airborne platform at reference numeral 402 based on various factors, the primary ones of which being the weight or volume of a shipping container. Other important factors may include the type UAV that may be assembled using the selected platform (e.g., quad copter vs. fixed wing craft) and the ability for the selected platform to be assembled with other components that may be necessary for the delivery, such as certain thrusters 292 and/or sensors 294.

The selection of one or more of the thrusters 292 by the assembly engine 210 at reference numeral 407 may be based on various factors including a remaining amount of delivery time, desired flight speed, required lift, or other factors. Individual thrusters 292 may be selected in a combination at reference numeral 407 to provide a desired arrangement of thrusters. The assembly engine 210 may also consider the amount of power required by the selected thrusters 292, and balance that with the selection of one or more of the batteries 296, for example, taking the distance to the delivery zone into account.

The selection of one or more of the sensors 293 by the assembly engine 210 at reference numeral 408 may be based on the need for accuracy in flight at certain times of day or in certain types of weather, approach to the delivery zone, the ability to capture topography data, or other factors. The selection of a control system 294 by the assembly engine 210 at reference numeral 406 may be based on the need for a certain level of processing ability and/or memory storage, such as the need to process and store images, radar, or other data in real time.

The selection of one or more of the airfoils 295 by the assembly engine 210 at reference numeral 410 may be based on the need for stability in certain types of weather, the need to achieve a certain rate of flight speed, or other appropriate factors. The selection of one or more of the batteries 296 by the assembly engine 210 at reference numeral 412 may be based on the amount of power needed for a certain flight duration, the weight of the shipping container(s) being transported, and other factors.

The selection of one or more of the loading bays 297 at reference numeral 414 may be based upon the size of the shipping container(s) being transported, the need to protect the shipping containers, and other factors. In some embodiments, a limited number of different sizes of shipping containers are available for selection. In that case, each of the available shipping containers may occupy a scalar amount of an internal volume of any one of the loading bays 297. In other words, each available shipping container may have a volume that is equal to one, one-half, one-third, one-quarter, or other fraction (i.e., a scalar amount) of the internal volume of one of the loading bays 297. In this way, when combinations of the shipping containers are placed into a loading bay 297, the shipping containers may occupy the entire volume of the loading bay 297 to prevent the shipping containers from moving or shifting. In some cases, spacers may be used to occupy empty space in a loading bay 297. Further, one or more of the shipping containers and/or the loading bay 297 may be balanced with counterweights or other components to provide stability for a UAV.

According to the concepts described herein, additional flexibility in airborne delivery may be achieved using modularity. For example, the maintenance, upkeep, and replacement of parts for a fleet of UAVs, including the UAVs 132 and 134, for example, may be simplified because the modular components 290 of the UAVs are stored as unassembled, separated components. Further, airborne delivery be achieved using UAVs composed of the least number of necessary components. Thus, in the case of the accidental loss or destruction of a UAV, it may be less expensive to replace the UAV. These and other advantages to using modular airborne delivery may be easily recognized.

Figure 5:
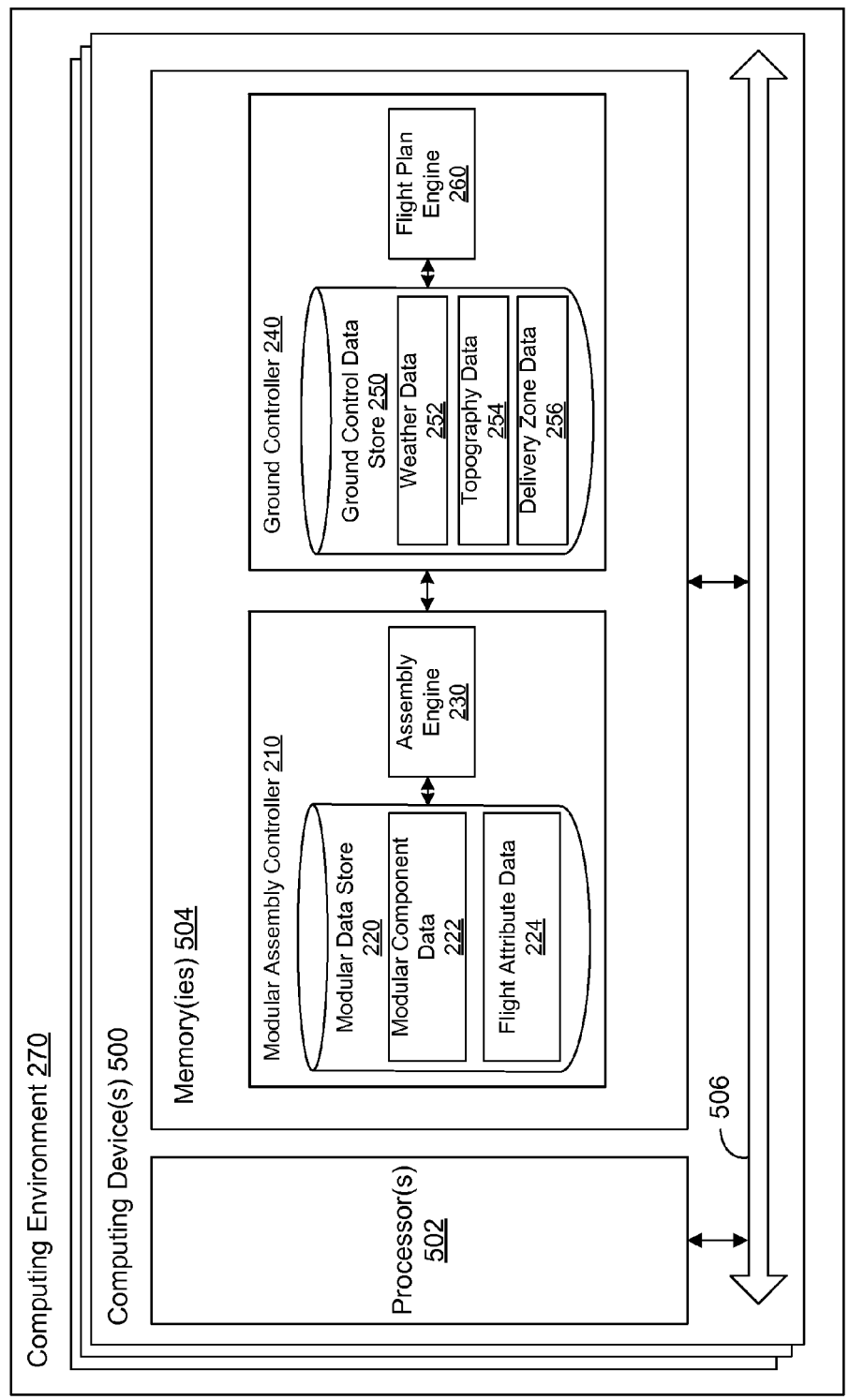
FIG. 5 illustrates an example schematic block diagram of the computing environment employed in the airborne carrier 130 in the system in FIG. 2 according to various embodiments of the present disclosure.

FIG. 5 illustrates an example schematic block diagram of the computing environment 270 in FIG. 2 according to various embodiments of the present disclosure. The computing environment 270 includes one or more computing devices 500. Each computing device 500 includes at least one processing system, for example, having a processor 502 and a memory 504, both of which are electrically and communicatively coupled to a local interface 506. To this end, each computing device 500 may be embodied as, for example, at least one server computer or similar device. The local interface 506 may be embodied as, for example, a data bus with an accompanying address/control bus or other bus structure as can be appreciated.

In various embodiments, the memory 504 stores data and software or executable-code components executable by the processor 502. For example, the memory 504 may store executable-code components associated with the modular assembly controller 210 and/or the ground controller 240 for execution by the processor 502. The memory 504 may also store data such as that stored in the modular data store 220 and/or the ground control data store 250, among other data.

It should be understood and appreciated that the memory 504 may store other executable-code components for execution by the processor 502. For example, an operating system may be stored in the memory 504 for execution by the processor 502. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 504 stores software for execution by the processor 502. In this respect, the terms "executable" or "for execution" refer to software forms that can ultimately be run or executed by the processor 502, whether in source, object, machine, or other form. Examples of executable programs include, for example, a compiled program that can be translated into a machine code format and loaded into a random access portion of the memory 504 and executed by the processor 502, source code that can be expressed in an object code format and loaded into a random access portion of the memory 504 and executed by the processor 502, or source code that can be interpreted by another executable program to generate instructions in a random access portion of the memory 504 and executed by the processor 502, etc. An executable program may be stored in any portion or component of the memory 504 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 504 may include both volatile and nonvolatile memory and data storage components. Volatile components are those that do not retain data values upon loss of power. Nonvolatile components are those that retain data upon a loss of power. Thus, the memory 504 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

In addition, the processor 502 may represent multiple processors 502 and/or multiple processor cores and the memory 504 may represent multiple memories that operate in parallel, respectively, or in combination. Thus, the local interface 506 may be an appropriate network or bus that facilitates communication between any two of the multiple processors 502, between any processor 502 and any of the memories 504, or between any two of the memories 504, etc. The local interface 506 may include additional systems designed to coordinate this communication, including, for example, a load balancer that performs load balancing. The processor 502 may be of electrical or of some other available construction.

As discussed above, the modular assembly controller 210 and/or the ground controller 240 may be embodied, in part, by software or executable-code components for execution by general purpose hardware. Alternatively, the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagrams in FIGS. 3 and 4 are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 502. The machine code may be converted from the source code, etc. Further, each block may represent, or be connected with, a circuit or a number of interconnected circuits to implement a certain logical function or process step.

Although the flowchart or process diagrams in FIGS. 3 and 4 illustrate a certain order, it is understood that the order may differ from that which is depicted. For example, an order of execution of two or more blocks may be scrambled relative to the order shown. In addition, two or more blocks shown in succession in FIGS. 3 and 4 may be executed concurrently or with partial concurrence. Further, in some embodiments, one or more of the blocks shown in FIGS. 3 and 4 may be skipped, omitted, or replaced. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

In addition, any logic or application described herein, including the modular assembly controller 210 and/or the ground controller 240 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIGS. 3 and 4. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Additionally, the computer-readable medium may include a RAM including, for example, an SRAM, DRAM, or MRAM. In addition, the computer-readable medium may include a ROM, a PROM, an EPROM, an EEPROM, or other similar memory device.

Further, any logic or application(s) described herein, including the modular assembly controller 210 and/or the ground controller 240, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 270. Additionally, it is understood that terms such as "application," "service," "system," "engine," "module," and so on may be interchangeable and are not intended to be limiting.

Disjunctive language, such as the phrase "at least one of X, Y, or Z," unless specifically stated otherwise, is used in general to present that an item, term, etc., may be either X, Y, or Z, or any combination thereof (e.g., X, Y, and/or Z). Thus, such disjunctive language is not generally intended to, and should not imply that, certain embodiments require at least one of X, at least one of Y, and at least one of Z to each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying a program that, when executed by at least one computing device, directs the at least one computing device to perform a method comprising:
    assessing weather along a route to a delivery zone for an airborne delivery of a shipping container;
    evaluating an approach to drop the shipping container at the delivery zone;
    calculating an amount of time remaining until a target delivery time for the airborne delivery;
    identifying a set of modular components to assemble an unmanned aerial vehicle (UAV) for the airborne delivery based in part on at least one of the weather along the route, the approach to drop the shipping container, and the amount of time remaining; and
    directing assembly of the UAV using the set of modular components, wherein identifying the set of modular components comprises:
        selecting a modular platform;
        selecting a thruster arrangement to provide thrust to the modular platform;
        selecting a control system to control the thruster arrangement; and
        selecting at least one sensor to provide data to a computing device of the UAV connected to the control system.

2. The non-transitory computer-readable medium of claim 1, wherein the method further comprises dispatching the UAV to the delivery zone to deliver the shipping container.

3. The non-transitory computer-readable medium of claim 1, wherein the method further comprises:
    selecting the modular platform for the UAV based in part on a volume and a weight of the shipping container;
    selecting the thruster arrangement based in part on the amount of time remaining; and
    selecting the at least one sensor based in part on the approach to drop the shipping container.

4. A system, comprising:
    at least one computing device; and
    an application stored in a memory that, when executed in the at least one computing device, directs the at least one computing device to perform a method comprising:
        assessing weather along a route to a delivery zone for airborne delivery of a shipping container;
        evaluating an approach to drop the shipping container at the delivery zone;
        calculating an amount of time remaining until a target delivery time for the airborne delivery;
        selecting a modular platform of an unmanned aerial vehicle (UAV) for delivery of the shipping container based in part on at least one of the weather along the route, the approach to drop the shipping container, and the amount of time remaining;
        selecting a thruster arrangement to provide thrust to the modular platform;
        selecting a control system to control the thruster arrangement; and
        selecting at least one sensor for navigation of the UAV based in part on at least one of the approach at the delivery zone and the weather along the route.

5. The system of claim 4, further comprising calculating the amount of time remaining until the target delivery time for the airborne delivery based in part on a target delivery time for the airborne delivery.

6. The system of claim 4, further comprising selecting the thruster arrangement to provide airborne thrust to the modular platform based in part on at least one of a weight of the shipping container or an amount of time remaining until a target delivery time.

7. The system of claim 6, wherein the method further comprises providing assembly instructions to assemble the UAV using the modular platform, the at least one sensor, and the thruster arrangement.

8. The system of claim 7, further comprising an assembler that assembles the UAV using the modular platform, the at least one sensor, and the thruster arrangement with reference to the assembly instructions.

9. The system of claim 4, wherein the method further comprises selecting a loading bay for the UAV based in part on a volume of the shipping container.

10. The system of claim 9, wherein the shipping container comprises a plurality of shipping containers.

11. The system of claim 10, wherein weight among the plurality of shipping containers is balanced in the loading bay and the plurality of shipping containers substantially occupy a volume of the loading bay.

12. The system of claim 4, wherein the method further comprises selecting at least one airfoil to stabilize the modular platform based in part on the weather.

13. The system of claim 4, wherein the method further comprises dispatching the UAV to deliver the shipping container according to flight plan instructions from a ground controller.

14. A method, comprising:
- assessing weather along a route to a delivery zone for airborne delivery of a shipping container;
- evaluating an approach to drop the shipping container at the delivery zone;
- calculating, by at least one computing device, an amount of time remaining until a target delivery time for the airborne delivery of the shipping container;
- selecting a modular platform of an unmanned aerial vehicle (UAV) for delivery of the shipping container based in part on at least one of the weather along the route, the approach to drop the shipping container, and the amount of time remaining;
- selecting a thruster arrangement to provide thrust to the modular platform;
- selecting a control system to control the thruster arrangement; and
- selecting at least one sensor for navigation of the UAV based in part on at least one of the approach at the delivery zone and the weather along the route.

15. The method of claim 14, further comprising assessing present and future weather conditions along the route to the delivery zone.

16. The method of claim 15, wherein the method further comprises selecting at least one airfoil to stabilize the UAV based in part on the weather.

17. The method of claim 14, further comprising selecting a thruster arrangement to provide airborne thrust for the UAV based in part on the amount of time remaining.

18. The method of claim 17, further comprising providing assembly instructions to assemble the UAV using the modular platform, the at least one sensor, and the thruster arrangement.

19. The method of claim 14, wherein:
- the shipping container comprises plurality of shipping containers, each of the plurality of shipping containers having a container volume which is a scalar factor of a volume of a loading bay for the UAV; and
- the method further comprises balancing weight among the plurality of shipping containers in the loading bay.

20. The method of claim 14, further comprising dispatching the UAV to deliver the shipping container according to flight plan instructions from a ground controller.

* * * * *